US012047397B2

(12) United States Patent
Subramanya et al.

(10) Patent No.: US 12,047,397 B2
(45) Date of Patent: Jul. 23, 2024

(54) SCORED THREAT SIGNATURE ANALYSIS

(71) Applicant: Sophos Limited, Abingdon (GB)

(72) Inventors: Santosh Subramanya, Bangalore (IN); Shankar Jayaraman, Bangalore (IN); Sajimon Kurien, Kottayam (IN); Mukesh Kumar, Bangalore (IN); Guruskanthan Viswanathan, Chennai (IN); Sean McDonald, New South Wales (AU)

(73) Assignee: Sophos Limited (GB)

( * ) Notice: Subject to any disclaimer, the term of this patent is extended or adjusted under 35 U.S.C. 154(b) by 0 days.

(21) Appl. No.: 17/750,640

(22) Filed: May 23, 2022

(65) Prior Publication Data

US 2023/0319070 A1  Oct. 5, 2023

(30) Foreign Application Priority Data

Mar. 30, 2022  (IN) .............................. 202211019038

(51) Int. Cl.
*H04L 9/00* (2022.01)
*H04L 9/40* (2022.01)
(52) U.S. Cl.
CPC .......... *H04L 63/1416* (2013.01); *H04L 63/20* (2013.01)
(58) Field of Classification Search
CPC ........................... H04L 63/1416; H04L 63/20
(Continued)

(56) References Cited

U.S. PATENT DOCUMENTS 8,010,685 B2  8/2011  Singh et al.
8,239,948 B1 *  8/2012  Griffin .................. G06F 21/577
726/22
(Continued)

FOREIGN PATENT DOCUMENTS

WO  2020212442 A1  10/2020

OTHER PUBLICATIONS

Allodi, et al. "Comparing Vulnerability Severity and Exploits Using Case-Control Studies" ACM Transactions on Information and System Security, vol. 17, No. 1, Article 1, Aug. 2014.
(Continued)

*Primary Examiner* — Christopher J Brown
(74) *Attorney, Agent, or Firm* — Danielson Legal LLC

(57) ABSTRACT

Methods and systems for detecting threats using threat signatures loaded in a computing device. The methods include receiving a first plurality of threat signatures at a computing device, at least one threat signature of the first plurality of threat signatures having been assigned a score based on at least one metadata attribute having been added to the at least one threat signature; receiving a selection of a second plurality of threat signatures from the first plurality of threat signatures to load into random access memory (RAM) of the computing device, wherein at least one threat signature of the selected plurality of threat signatures is selected based on its assigned score; scanning network traffic accessible by the computing device using the at least one threat signature of the selected plurality of threat signatures; detecting a threat in the network traffic based on the scanning using the at least one threat signature of the selected plurality of threat signatures; and performing a remedial action upon detecting the threat in the network traffic.

17 Claims, 10 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 10,893,058 | B1* | 1/2021 | Casaburi | ............... G06F 21/566 |
| 10,929,531 | B1 | 2/2021 | Kenemer | |
| 2005/0097339 | A1 | 5/2005 | Wiley et al. | |
| 2007/0169194 | A1 | 7/2007 | Church et al. | |
| 2009/0077663 | A1 | 3/2009 | Sun et al. | |
| 2016/0078229 | A1 | 3/2016 | Gong et al. | |
| 2017/0039371 | A1* | 2/2017 | Lukacs | ................. G06F 3/0653 |

OTHER PUBLICATIONS

Jacobs, et al. "Improving Vulnerability Remediation Through Better Exploit Prediction" Journal of Cybersecurity, vol. 6, Issue 1, 2020.

Bozorgi, et al. "Beyond Heuristics: Learning to Classify Vulnerabilities and Predict Exploits" Department of Computer Science and Engineering, University of California, San Diego. Jul. 2010.

Edkrantz. "Predicting Exploit Likelihood for Cyber Vulnerabilities with Machine Learning" Department of Computer Science and Engineering, Chalmers University of Technology. Gothenburg, Sweden 2015.

Bullough, et al. "Predicting Exploitation of Disclosed Software Vulnerabilities Using Open-source Data" IWSPA. Scottsdale, Arizona, 2017.

Written Opinion and International Search Report of the International Searching Authority for PCT/GB2023/050474, dated Jun. 1, 2023. 13 pages.

International Search Report for PCT/GB2023/050474, dated Jun. 1, 2023, 4 pages.

Written Opinion for PCT/GB2023/050474, dated Jun. 1, 2023, 8 pages.

* cited by examiner

1000 alert tcp $EXTERNAL_NET any -> $HOME_NET $HTTP_PORTS (msg:"SERVER-WEBAPP HTTP SAMPLE SIGNATURE CVE-2021-XXXX" Remote Code Execution; flow:to_server,established; content:"POST"; http_method; content:"abcd"; content:"abcd"; content:"abcd"; metadata:service http, vendor Apache, exp_wild True, cvss 9.4,vuln Code execution, exp_avbl True, emerg True, sigtype generic, cves CVE-2021-XXXX, cve_ts 2021-ZZ-ZZ, score 83.0,Telemetry True, Performance Good; sid:YYYYY;)

CVSS Score: 9.4
Emerging Threat: True
CVE Exploited in The Wild: True
Published Exploit Available : True
Vendor: Apache
CVE Year: 2021
Vulnerability Type: Remote Code Execution
Telemetry: True
Performance: Good
TALOS Category: SERVER-WEBAPP

*FIG. 10*

SCORED THREAT SIGNATURE ANALYSIS

CROSS-REFERENCE TO RELATED APPLICATIONS

The present application is the domestic filing of and claims the benefit of Indian Patent Application No. 202211019562, filed in India on Mar. 31, 2022.

TECHNICAL FIELD

The present application relates generally to threat management systems and methods and, more particularly but not exclusively, to systems and methods for threat detection using signature-based scanning of network activity.

BACKGROUND

Network threats may be detected by inspection at various levels. Many threat detection technologies operate by inspecting data in various states such as in transit, in storage, in memory, during processing, or the like, and then checking whether the data matches specific criteria provided as a signature. One or more signatures can be formulated to detect one or more threats such as ransomware, malware, malformed packets, software vulnerabilities, and other such threats or combinations thereof.

The number of threats has continued to increase each year. Accordingly, to identify these threats, the number of signatures needed to detect these threats increases as well. A computing device may be configured to store the signatures, and then use the signatures in identifying threats and/or preventing an identified threat. However, a computing device may have limited computing resources (e.g., memory, processors, network bandwidth, and so forth) for storing and using these signatures.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for detecting threats using threat signatures loaded in a computing device. The method includes receiving a first plurality of threat signatures at a computing device, at least one threat signature of the first plurality of threat signatures having been assigned a score based on at least one metadata attribute having been added to the at least one threat signature; receiving a selection of a second plurality of threat signatures from the first plurality of threat signatures to load into random access memory (RAM) of the computing device, wherein at least one threat signature of the selected plurality of threat signatures is selected based on its assigned score; scanning network traffic accessible by the computing device using the at least one threat signature of the selected plurality of threat signatures; detecting a threat in the network traffic based on the scanning using the at least one threat signature of the selected plurality of threat signatures; and performing a remedial action upon detecting the threat in the network traffic.

In some embodiments, performing the remedial action includes issuing an alert regarding the detected threat.

In some embodiments, the method further includes determining an amount of RAM available on the computing device, wherein an amount of the selected plurality of threat signatures is further based on the amount of determined RAM available on the computing device.

In some embodiments, the method further includes storing the first plurality of threat signatures in a signature database associated with the computing device.

In some embodiments, the selection of the second plurality of threat signatures includes a predefined first subset of threat signatures that are associated with a first tier of threat signatures and a predefined second subset of threat signatures that are associated with a second tier of threat signatures. In some embodiments, the first tier is associated with threat signatures having been assigned a score in a first range, and the second tier is associated with threat signatures having been assigned a score in a second range.

In some embodiments, the at least one metadata attribute having been added to the at least one threat signature includes a quality score having been determined by determining a signature cost associated with the threat signature, comparing the signature cost to a baseline performance value, and adding the quality score to the threat signature based on the comparison of the signature cost to the baseline performance value.

According to another aspect, embodiments relate to a computing device for identifying threats in monitored network activity. The computing device includes an interface for receiving a first plurality of threat signatures, at least one threat signature of the first plurality of threat signatures having been assigned a score based on at least one metadata attribute having been added to the at least one threat signature and receiving a selection of a second plurality of threat signatures from the first plurality of threat signatures that are loaded into random access memory (RAM) of the computing device, wherein at least one threat signature of the selected plurality of threat signatures is selected based on its assigned score; and one or more processing devices executing computer-executable instructions for scanning network traffic using at least one threat signature of the selected plurality of threat signatures, detecting a threat in the network traffic based on the scanning using the at least one threat signature of the selected plurality of threat signatures, and performing a remedial action upon detecting the malicious pattern in the network traffic.

In some embodiments, the one more or processing devices perform the remedial action by issuing an alert regarding the detected threat.

In some embodiments, an amount of the selected plurality of threat signatures is further based on an amount of RAM available on the computing device.

In some embodiments, the computing device further includes a signature database for storing the first plurality of threat signatures.

In some embodiments, the selection of the second plurality of threat signatures includes a predefined first subset of threat signatures that are associated with a first tier of threat signatures and a predefined second subset of threat signatures that are associated with a second tier of threat signatures. In some embodiments, the first tier is associated with threat signatures having been assigned a score in a first range, and the second tier is associated with threat signatures having been assigned a score in a second range.

In some embodiments, the at least one metadata attribute having been added to the at least one threat signature includes a quality score having been determined by determining a signature cost associated with the threat signature, comparing the signature cost to a baseline performance value, and adding the quality score to the threat signature based on the comparison of the signature cost to the baseline performance value.

According to yet another aspect, embodiments relate to a system for monitoring network activity. The system includes one or more processing devices executing computer-executable instructions to add at least one metadata attribute to each of a first plurality of threat signatures, assign a signature score to each of the first plurality of threat signatures utilizing the at least one metadata attribute added to each of the first plurality of threat signatures, and transmit the first plurality of threat signatures including the added at least one metadata attribute to a computing device, wherein the computing device is configured to scan network traffic using at least one threat signature of the first plurality of threat signatures.

In some embodiments, the one or more processing devices are further configured to determine an amount of RAM available on the computing device, and an amount of the first plurality of signatures selected and transmitted to the computing device is further based on the determined amount of RAM available on the computing device.

In some embodiments, the signature score assigned to each of the first plurality of threat signatures is a weighted average of the metadata attributes added to each of the first plurality of threat signatures.

In some embodiments, the at least one added metadata attribute is CVSS score, vulnerability type, exploited in the wild, existence of published exploit, CVE year, telemetry statistics, Talos Security Intelligence and Research Group (TALOS) category, signature performance, vendor, or threat recency.

In some embodiments, the first plurality of threat signatures includes a predefined first subset of threat signatures that are associated with a first tier of threat signatures and a predefined second subset of threat signatures that are associated with a second tier of threat signatures. In some embodiments, the first tier is associated with threat signatures having been assigned a score in a first range, and the second tier is associated with threat signatures having been assigned a score in a second range.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 10 depicts one example of a signature with added metadata attributes in accordance with one embodiment.

DETAILED DESCRIPTION

Figure 1:
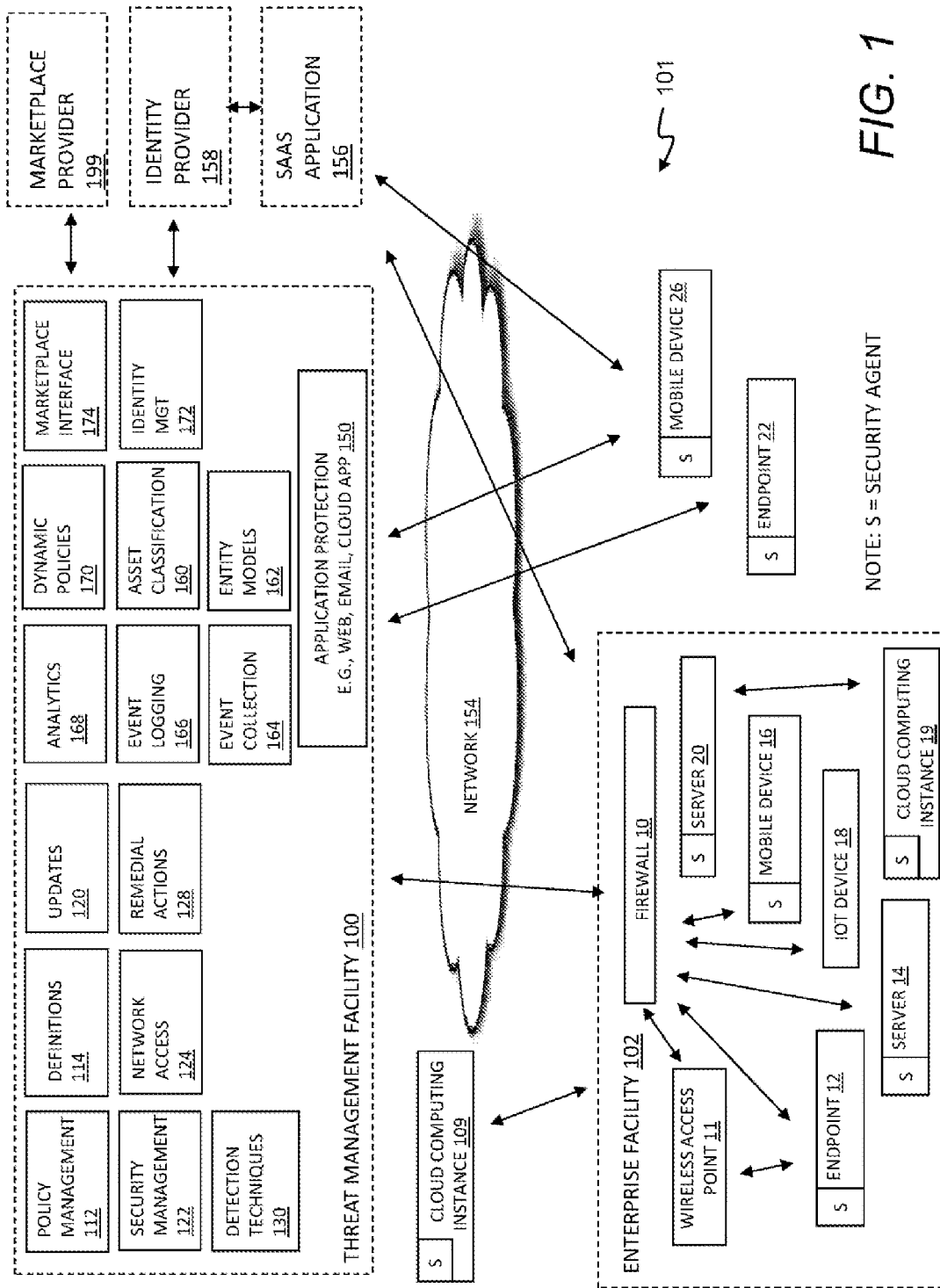
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments herein provide systems and methods for scoring signatures based on one or more metadata attributes. Intrusion detection or prevention systems (for simplicity, "IDS/IPS") may have limited random access memory (RAM) for supporting signatures for scanning network activity. Accordingly, the systems and methods herein may use the scores to select for a computing device the most appropriate signatures for scanning network activity.

Metadata attributes associated with a signature may include a Common Vulnerability Scoring System score (for simplicity, "CVSS score"), vulnerability type, whether the vulnerability or threat is exploited in the wild, whether a published exploit is available for the threat, the year in which the "CVE" code was released, telemetry statistics, TALOS category, vendor, whether the threat is an emerging threat or a zero-day threat, or some combination thereof. This list is merely to demonstrate various examples and other metadata attributes or parameters, whether available now or invented hereafter, in addition to or in lieu of these may be used to accomplish the objectives of the embodiments herein.

For example, the embodiments herein may also consider performance-based data associated with a signature. This data may be expressed in terms of cost or quality. Cost may be indicative of a reduction in performance that an inspection engine experiences because of a signature or signature set. A signature that causes less "drag" is a higher performance signature than a signature that causes more "drag."

To quantify performance, the embodiments herein may compare the costs of signatures when executing a test case. For example, a first signature's performance may be compared to the performance of another signature that acts as a baseline. As discussed later, a profile of a signature may refer to its performance on a test case under one or more configuration parameters.

The cost determinations may be executed on hardware with one or more physical central processing unit (CPU) cores. The cost determinations may be executed in an isolated portion of a processing unit, such as in an isolated CPU core. In these scenarios, the system does not run any other processes in the isolated CPU core or otherwise in the isolated portion of a processing unit. This may involve modifying the system or kernel code or adding additional firmware or drivers to the system.

The systems and methods herein may rank signatures based on their scores, and then transmit a first plurality of signatures to a computing device for scanning network activity. The computing device may have a finite amount of RAM available for storing signatures for threat detection. The first plurality of signatures may therefore include a second plurality of signatures that are selected for loading into RAM of the computing device. The second plurality of signatures may be selected based on their assigned scores and the amount of RAM available.

The computing device may then scan network traffic accessible to the computing device using one or more of the selected threat signatures. If the computing device detects a threat based on the scanning, such as if a pattern in traffic matches a signature, the computing device may perform one or more remedial actions.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22,26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19,109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
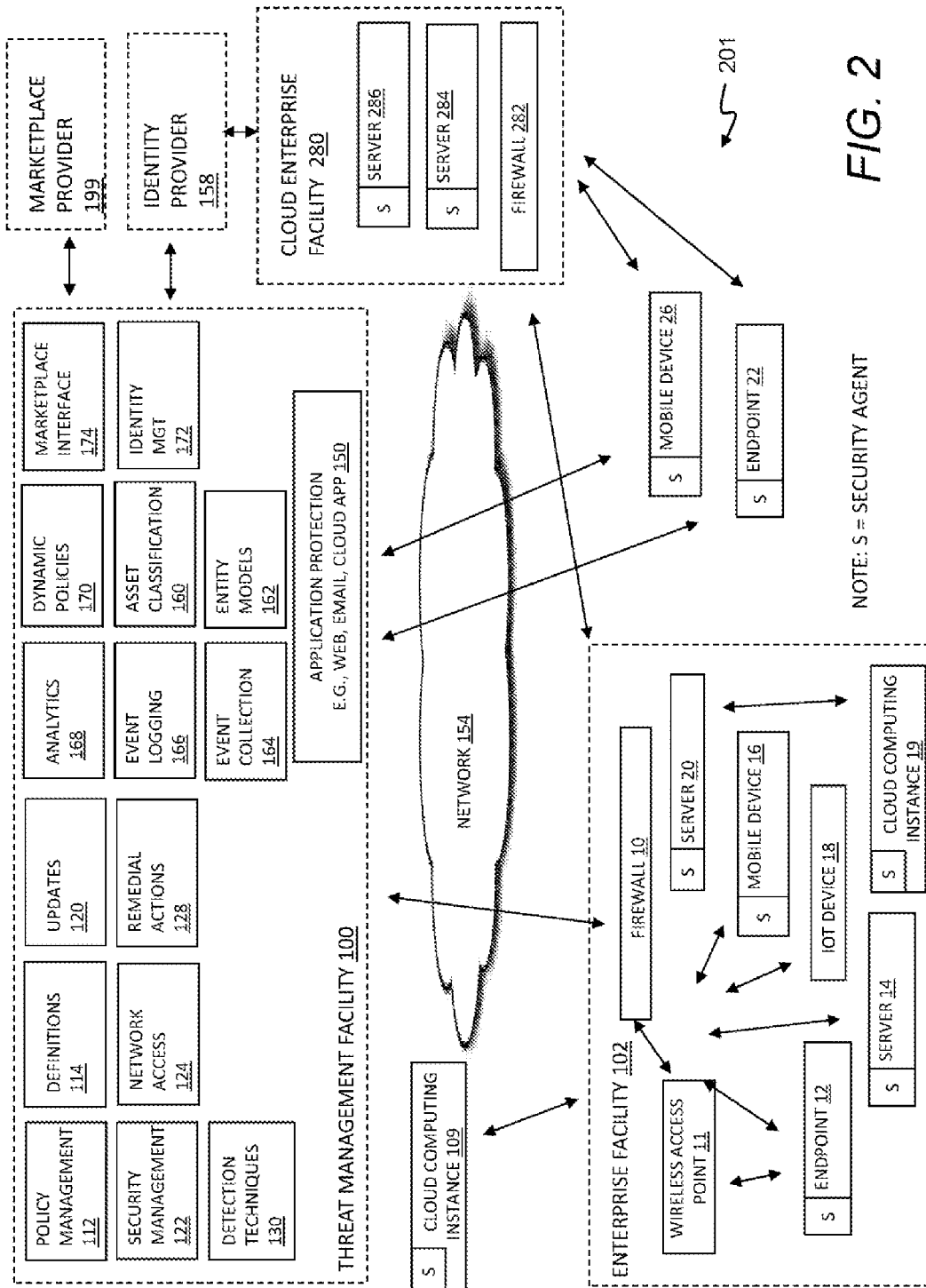
FIG. 2 illustrates a block diagram of a threat management system in accordance with another embodiment.

FIG. 2 illustrates a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 or compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
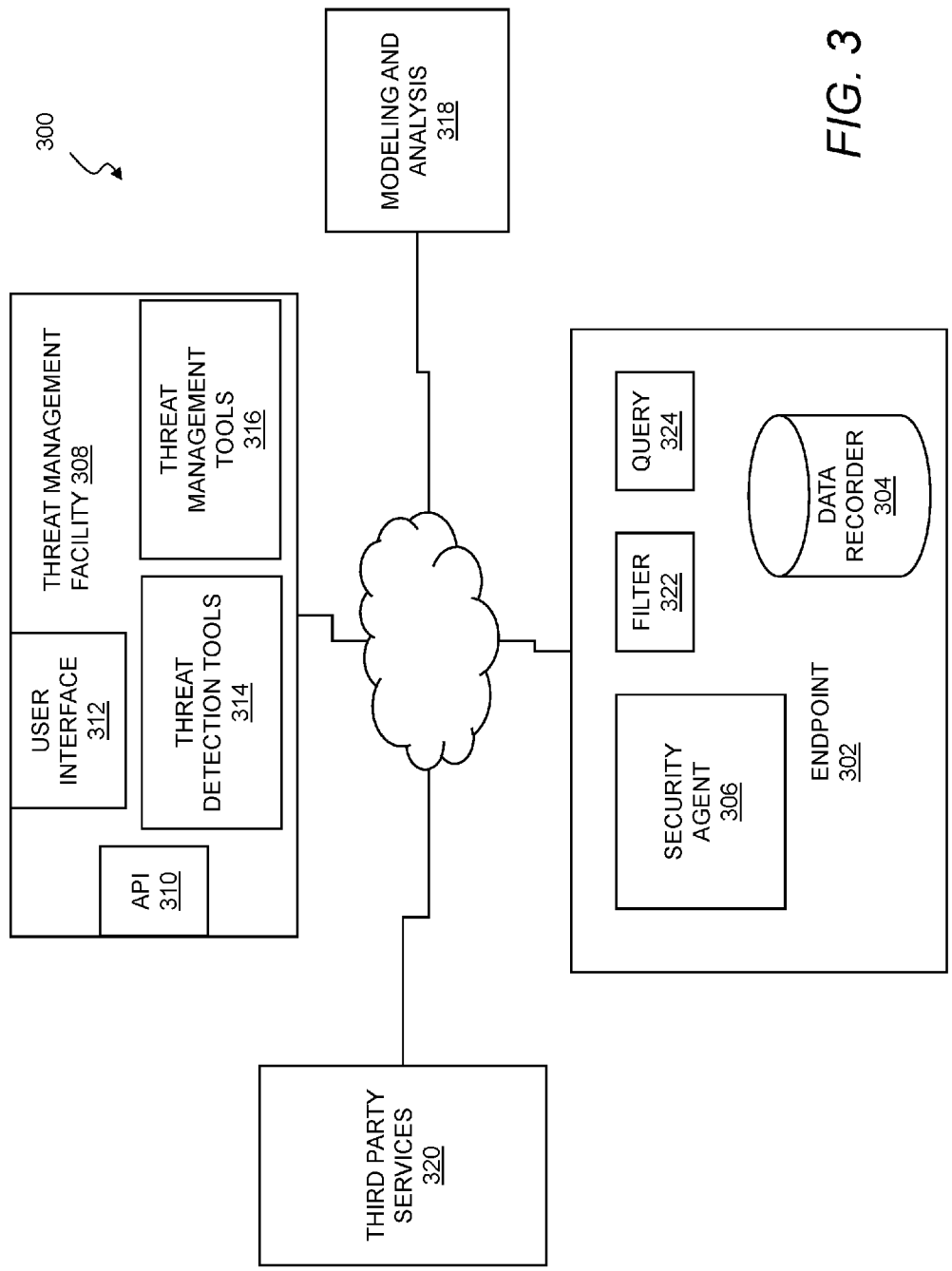
FIG. 3 illustrates a system for enterprise network threat detection in accordance with one embodiment.

FIG. 3 shows a system 300 for enterprise network threat detection in accordance with one embodiment. The system 300 may use any of the various tools and techniques for threat management contemplated herein. In the system 300, a number of endpoints or computing devices such as the endpoint 302 may log events in a data recorder 304. A local agent on the endpoint 302 such as the security agent 306 may filter this data and feed a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploy a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to an Active Directory or other customer information about files, data storage, identities and user profiles, roles, access privileges and so forth. More generally the application programming interface 310 may provide a programmatic interface for customer or other third-party context, information, administration and security tools, and so forth. The application programming interface 310 may also or instead provide a programmatic interface for hosted applications, identity provider integration tools or services, and so forth.

The user interface 312 may include a web site or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature-based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or devices the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint 302. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, the threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators (URLs), network flows, and files. The system may also or instead use tuples to uniquely identify communications or network connections based on, e.g., source and destination addresses and so forth.

According to the foregoing, a system disclosed herein includes an enterprise network, an endpoint 302 coupled to the enterprise network, and a threat management facility 308 coupled in a communicating relationship with the endpoint 302 and a plurality of other endpoints $302^N$ through the enterprise network. The endpoint 302 may have a data recorder 304 that stores an event stream of event data for computing objects, a filter 322 for creating a filtered event stream with a subset of event data from the event stream, and a query interface 324 for receiving queries to the data recorder 304 from a remote resource, the endpoint 302 further including a local security agent 306 configured to detect malware on the endpoint 302 based on event data stored by the data recorder 304, and further configured to communicate the filtered event stream over the enterprise network. The threat management facility 308 may be configured to receive the filtered event stream from the endpoint 302, detect malware on the endpoint 302 based on the filtered event stream, and remediate the endpoint 302 when malware is detected, the threat management facility 308 further configured to modify security functions within the enterprise network based on a security state of the endpoint 302.

The threat management facility 308 may be configured to adjust the reporting of event data through the filter 322 in response to a change in the filtered event stream received from the endpoint 302. The threat management facility 308 may be configured to adjust the reporting of event data through the filter 322 when the filtered event stream indicates a compromised security state of the endpoint 302. The threat management facility 308 may be configured to adjust reporting of event data from one or more other endpoints 302 in response to a change in the filtered event stream received from the endpoint 302. The threat management facility 308 may be configured to adjust reporting of event data through the filter 322 when the filtered event stream indicates a compromised security state of the endpoint 302. The threat management facility 308 may be configured to request additional data from the data recorder 304 when the filtered event stream indicates a compromised security state of the endpoint 302. The threat management facility 308 may be configured to request additional data from the data recorder 304 when a security agent 306 of the endpoint 302 reports a security compromise independently from the filtered event stream. The threat management facility 308 may be configured to adjust handling of network traffic at a gateway to the enterprise network in response to a predetermined change in the filtered event stream. The threat management facility 308 may include a machine learning model for identifying potentially malicious activity on the endpoint 302 based on the filtered event stream. The threat management facility 308 may be configured to detect potentially malicious activity based on a plurality of filtered event streams from a plurality of endpoints $302^N$. The threat management facility 308 may be configured to detect malware on the endpoint 302 based on the filtered event stream and additional context for the endpoint 302.

The data recorder 304 may record one or more events from a kernel driver. The data recorder 304 may record at least one change to a registry of system settings for the endpoint 302. The endpoints $302^N$ may include a server, a firewall for the enterprise network, a gateway for the enterprise network, or any combination of these. The endpoint 302 may be coupled to the enterprise network through a virtual private network or a wireless network. The endpoint 302 may be configured to periodically transmit a snapshot of aggregated, unfiltered data from the data recorder 304 to the threat management facility 308 for remote storage. The data recorder 304 may be configured to delete records in the data recorder 304 corresponding to the snapshot in order to free memory on the endpoint 302 for additional recording.

The endpoint 302 may be configured with or otherwise be in operable communication with a firewall device (not shown) configured to receive signatures for scanning network activity. The endpoint 302 may receive a plurality of threat signatures, with some or all of the received signatures selected for loading into RAM for scanning network activity.

Figure 4:
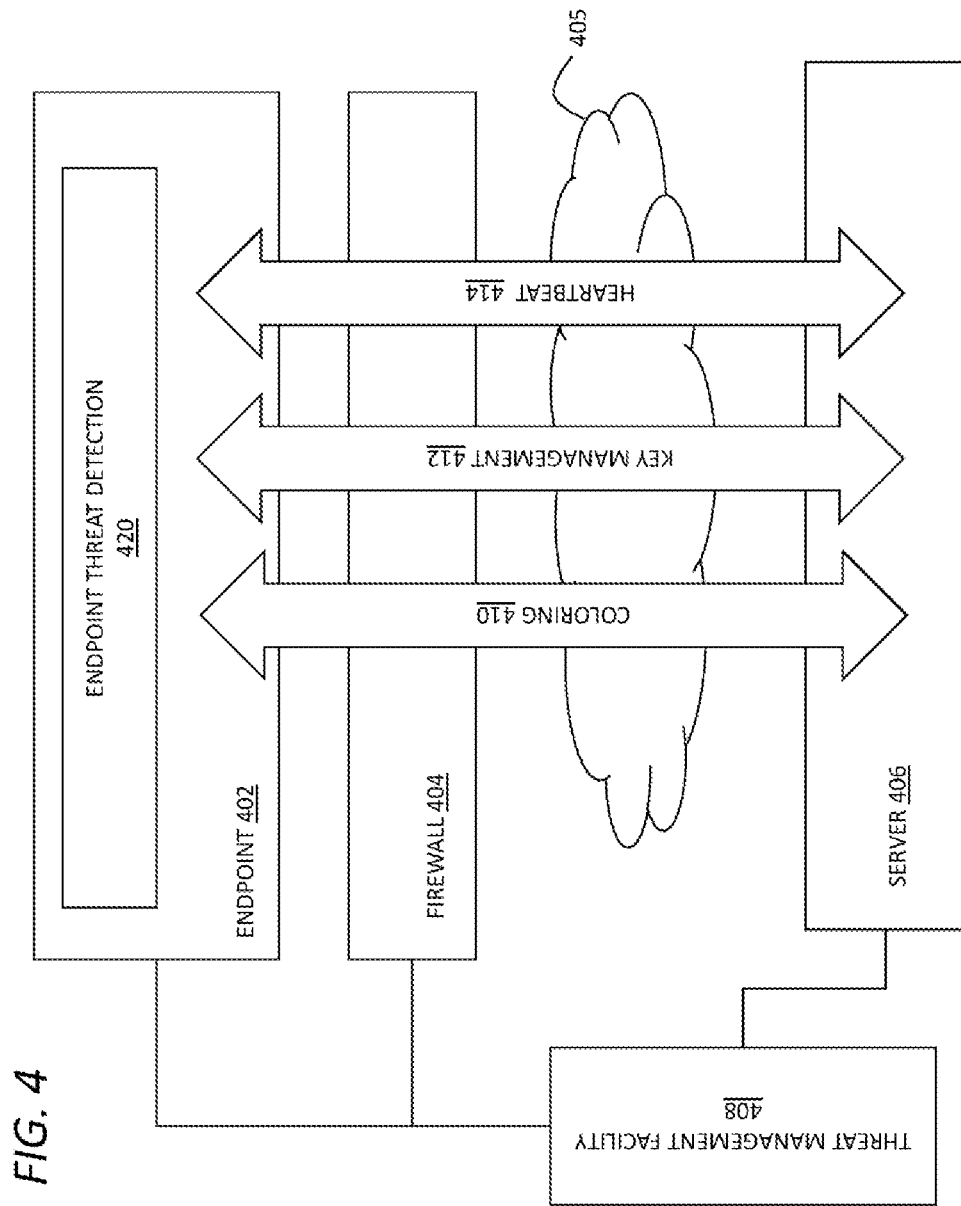
FIG. 4 illustrates a threat management system in accordance with one embodiment.

FIG. 4 illustrates a threat management system in accordance with another embodiment. In general, the system may include an endpoint 402, a firewall 404, a server 406, and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

In accordance with some embodiments herein, a computing device such as the endpoints 302 or 402 of FIGS. 3 and 4, respectively, may receive a first plurality of threat signatures. Each of the received threat signatures may be associated with a score that is based on one or more metadata attributes associated with the signature.

For example, a server may analyze a plurality of signatures and assign a score to each signature based on attributes associated with each signature. Accordingly, some embodiments herein may be directed towards methods and systems for scoring signatures based on various parameters that determine the severity of an associated threat.

Figure 5:
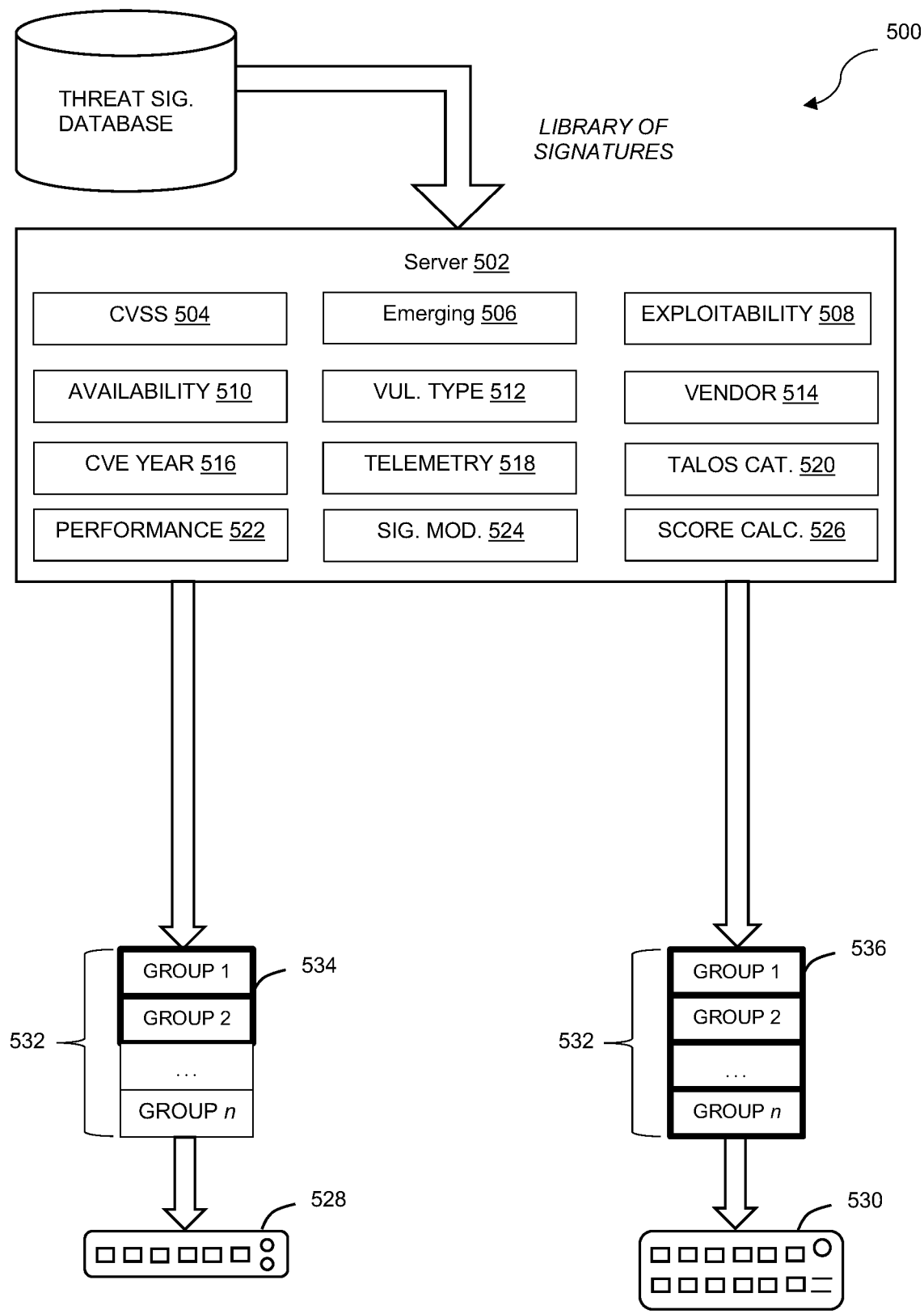
FIG. 5 illustrates a server configured to score signatures in accordance with one embodiment.

FIG. 5 illustrates a system 500 for monitoring network activity in accordance with one embodiment, wherein the system 500 includes a server 502 for scoring signatures. The server 502 may include one or more processors executing instructions on memory to provide various modules for scoring threat signatures. These modules may include, but are not limited to, one or more of a CVSS score module 504, an emerging threat analysis module 506, an exploitability module 508, an exploit availability module 510, a vulnerability type module 512, a vendor module 514, a CVE year module 516, a telemetry module 518, a TALOS category module 520, and a performance module 522. The server 502 may also include a signature modification module 524 to modify signatures and a score calculation module 526 to process scores outputted by one or more of the modules 504-22.

The CVSS Score module 504 may assign a CVSS score to a signature based on the criticality of the threat associated with the signature. The assigned CVSS score may be a number selected from a predetermined range, such as the range of one through ten. Furthermore, scores may be grouped into one or more predefined and/or predetermined groups. For example, scores may be grouped into ten groups, labeled as "P1" through "P10." Each of the groups may correspond to a particular value selected from the predetermined range. For example, a signature with a score of "10" may be assigned into Group P1. A signature with a score of "1" may be assigned into Group P10.

In addition, the values of the predetermined range may be associated with different levels of criticality. In one embodiment, the value of "1" is associated with the lowest criticality, whereas the value of "10" is associated with the highest criticality. In another embodiment, the value of "1" is associated with the highest criticality and the value of "10" is associated with the lowest criticality. In this manner, the value of the CVSS score may indicate the criticality of a particular signature.

The emerging threat analysis module 506 may analyze whether a threat associated with a signature is an emerging threat. In one embodiment, the emerging threat analysis module 506 is a binary classifier, in that it assigns a first value (e.g., "10") to a threat that is emerging, and assigns a second value (e.g., "0") to a threat that is not an emerging threat.

The exploitability module 508 may analyze whether a threat associated with a signature is a CVE that is exploited in the wild. If a CVE is exploited, it should be remedied before CVEs that are not exploited are remedied. Similar to the emerging threat analysis module 506, the exploitability module 508 may be a binary classifier and assign a score of 10 to a threat that is exploited in the wild or assign a score of zero ("0") if the threat is not exploited in the wild.

The availability module 510 may be configured to determine whether there is a published exploit available for a threat associated with a signature. Like the emerging threat analysis module 506 and/or the exploitability module 508, the availability mode 510 may be configured as a binary classifier and further configured to assign a score of ten to a signature if an associated threat has an available exploit, and a score of zero to a signature if there is not an exploit available.

The vulnerability type module 512 may analyze a signature to determine the type of vulnerability associated with the signature. The vulnerability type module 512 may reference one or more databases storing records associated with a signature, which may list the type of vulnerability (e.g., a Bypass vulnerability, a Denial-of-Service vulnerability, etc.) associated with a signature. The vulnerability type module 512 may also consider characteristics or patterns associated with a signature to determine the type of vulnerability.

Signatures can be developed generically or specifically as a proof-of-concept (PoC). Most browser-based vulnerabilities, for example, are treated as PoC vulnerabilities. These types of exploits can be written in different ways and can evade pure IPS-based detection as it is difficult to cover all variations of a signature.

In some cases it may not be possible to define a vulnerability in a generic way. For example, scanning file formats such as the Portable Document Format (PDF) or Enhanced MetaFile (EMF) for a generic vulnerability would be detrimental in terms of performance. In these situations, the embodiments herein cover a PoC vulnerability based on the malicious file being available.

By analyzing a vulnerability type associated with a particular signature, the vulnerability type module 512 may further classify a signature into one of several vulnerability type groups. There may be one or more vulnerability type groups (e.g., one, two, three, etc., vulnerability type groups). In one embodiment, the system 500 defines the vulnerability groups as P1-P5, where each vulnerability type group is assigned a corresponding score. The corresponding score may be assigned from one or more predetermined values (e.g., from a range of one to ten). One example of the vulnerability type groups are shown in Table 1 below, where corresponding vulnerabilities are identified for each associated vulnerability type group:

TABLE 1

Vulnerability Type Groups and Scores

| Group | Vulnerability Type | Group Score |
|---|---|---|
| P1 | Memory corruption, Code exec or Remote Code Execution, Memory leak, Stack/Heap Overflow, Pointer dereference, Type Confusion, Use-after-free, Deserialization, Format String | 10 |
| P2 | Command Injection, SQL Injection, XSS, CSRF, Directory traversal, File Operation, Information Disclosure | 8 |
| P3 | Denial-of-Service (DoS) | 6 |
| P4 | Authentication Bypass, Man-In-The-Middle, ActiveX | 4 |
| P5 | Privilege Escalation, Misc. | 2 |

The vendor module 514 may determine the vendor of the of the signature, and assign the signature into a group P1-P10 based on the vendor. In one embodiment, the system 500 may include a data structure, e.g., a two-dimensional table or the like, that correlates a particular vendor with a vulnerability type group. For example, where the vendor module 514 determines that a signature associated with a vendor such as MICROSOFT®, the vendor module 514 may group the signature into vulnerability type group P1 and assign a score of 10. Higher values assigned to vulnerability type groups may indicate whether a vendor is widely popular and/or whether exploits are more likely to be directed to its products.

The CVE Year module 516 may determine the year in which a CVE associated with a signature was released. The CVE Year module 516 may assign higher scores to more recent CVEs, as they are likely more critical. For example, there may be several remediations available for older CVEs, but less remediations available for newer CVEs.

The telemetry module 518 may determine whether telemetry statistics are available for a signature. Telemetry statistics may refer to characteristics of a connection. These may include, but are not limited to, any one or more of source IP address of a connection, destination IP address of a connection, destination port(s), source port(s), time of connection, duration of connection, counts of signature triggers across all customers, counts of unique customer boxes on which a signature has triggered, counts of signatures triggered on each customer box, or the like.

In one embodiment, the telemetry module 518 is implemented as a binary classifier in that it assigns a first predetermined value (e.g., a score of "10") to a signature associated with a threat for which telemetry statistics are available, and assigns a second predetermined value (e.g., score of "0") if telemetry statistics are not available.

The TALOS category module 520 may assign a signature to a TALOS category. The TALOS category to which a signature is assigned may be based on criteria such as protocol prevalence, the importance of the protocol in a network, the amount of traffic related to the protocol generally seen in the internet, the impact on an organization if captures live network packet data from Layers 2-7 of the Open Systems Interconnection (OSI) model. One example of such an API is Packet Capture (a.k.a., "PCAP" or "libpcap"). In one embodiment, one or more signatures may be created that perform at certain levels (e.g., custom "good" and "bad" signatures). The performance costs of the one or more signatures may be calculated and/or measured. These sets of signatures are referred to as baseline signatures. Baseline signatures may be generated for each type of classification and for each of the above protocols or profiles.

Examples of baseline signatures for HTTP and their associated classifications are shown below:

---

Classification: Very Good
    alert tcp any any -> any $HTTP_PORTS (msg:"PROFILING-BASE HTTP Low"; flow:to_server; content:"HTTP|2f1|2e|"; offset:15; depth:7; content:"/test/test1.html"; http_uri; fast_pattern; metadata: service http; sid:100000002; )
Classification: Good
    alert tcp any $HTTP_PORTS -> any any (msg:"PROFILING-BASE HTTP Medium"; flow:to_client; content:"HTTP|2f1|2e|"; offset:0; depth:7; content:"content-length"; fast_pattern; nocase; pcre:"/content-length\s*x3a\s*\d+\x0d\x0a/i"; metadata: service http; sid:100000003; )
Classification: Bad
    alert tcp any any -> any any (msg:"PROFILING-BASE HTTP High"; pcre:"/content-length.*\x0d\x0a\x0d\x0a/i"; sid:100000004; )
Classification: Very Bad
    alert tcp any any -> any any (msg:"PROFILING-BASE HTTP Very High"; content:"|0d|"; pcre:"/\x0d\x0a{2}.*/"; content:"|00|"; sid:100000005; )

--- products supporting these protocols have vulnerabilities that are discovered, locations of vulnerabilities, or some combination thereof. Each TALOS category is associated with a group P1-P10, and each group P1-P10 may be associated with a score as discussed previously.

The performance module 522 may determine or at least reference the performance of the signature. In some instances, a first signature may perform differently (e.g., better or worse) than a second signature. For example, code (e.g., the code used to write a signature) that does not comply with the Perl Compatible Regular Expressions (PCRE) library may impact the performance and throughput of a computing device. Accordingly, the performance module 522 may assess the quality of the received signatures as determined by their cost or performance.

To determine the performance of received signatures, the performance module 522 may calculate a signature cost for each signature and may compare the cost against a baseline value. Depending on the amount of deviation from the baseline value, a signature may be classified into one of a number of groups. For example, the performance module 522 may classify a signature into one of four groups: very good, good, bad, or very bad.

Cost may be measured in packets per second ("pkts/sec"), and the signature cost is the number of packets per second of total packets relayed without signature minus the number of packets per second of total packets relayed with signature. The signatures are classified based on their cost.

Once the signature cost is calculated, it is compared against baseline values. The embodiments herein may store or otherwise access baseline profiles for various protocols or profiles. These may include, but are not limited to, Hypertext Transfer Protocol (HTTP), Doman Name Service (DNS), Financial Information Exchange (FIX), Session Initiation Protocol (SIP), File Transfer Protocol (FTP), Remote Desktop (RDP), Server Message Block (SMB), Simple Mail Transfer Protocol (SMTP), and WEBEX.

To calculate baseline values for protocols and profiles such as these, the embodiments herein may use an API that Baseline values may be generated by running an IDS such as the SNORT® Intrusion Detection System. Specifically, the embodiments herein may run an IDS without the baseline signature and record the number of packets per second relayed. Then, the IDS may run with the baseline signature and record the number of packets per second relayed. In one embodiment, the cost of the baseline signature is the difference in the number of packets per second relayed between the two runs. For example, using the baseline signatures previously shown above, the cost of the HTTP baseline signatures were determined to be:

TABLE 2

| Baseline Cost Classifications (difference in pkts/sec) | | | | |
| --- | --- | --- | --- | --- |
| Test case | Very Good | Good | Bad | Very Bad |
| HTTP | 855 | 3315 | 5246 | 5247+ |

The above scores and classification blocks are merely examples. The embodiments described herein may use more than four classification categories or less than four classification categories. Similarly, the scores associated with each classification may differ than what is shown in Table 2 above, particularly for different protocols.

The above steps are then repeated for a signature of interest (e.g., a signature associated with a known vulnerability or threat). That is, the performance module 522 may first execute an IDS without the signature of interest and capture the number of packets per second relayed.

Then, the performance module 522 may execute the IDS with the signature of interest and capture the number of packets per second relayed. The performance module 522 may then compute the cost of the signature by finding the difference between the executions of the IDS with and without the signature of interest.

Referring to Table 2 above, if the cost is 855 or less, the signature is classified as "Very Good." If the cost is between 856 and 3,315, it is classified as "Good"; between 3,316 and 5,246, "Bad"; and greater than 5,247, "Very Bad".

In some embodiments, the systems and methods herein may compute a cost of a signature or the cost of an entire signature set by running an operating system or kernel that allows the isolation of a portion of a CPU such as a single CPU core to execute an inspection engine. These embodiments may involve a cost measurement phase and a profile comparison phase.

A cost measurement phase detects the change in performance of an inspection engine when a specific signature or signature set is used compared against a test case. Embodiments herein may determine the cost of a signature or signature set compared to test cases by running the inspection engine without the signature(s) and with the signature(s). The difference in performance between the two executions indicates the cost of the signature(s).

The cost can be measured in different ways. For example, the cost can be described in terms of the amount of time taken to inspect the entire test case(s), and/or the time taken to process a unit of test case(s), which can be expressed as an average.

A signature set should be large enough to result in a meaningful cost. If a signature set is not large enough, the inspection engine may not detect a difference in performance between an execution with the signature set and an execution without the signature set. This would in turn result in an insignificant cost.

Accordingly, the embodiments herein may include an iteration phase to ensure a signature set is large enough. This may involve adding signatures to a set and testing the set against a test case until a meaningful score, and therefore cost, is obtained.

In the present application a "profile" may refer to the performance of a signature using one or more configuration parameters. A baseline profile stage can recognize how a specific runtime profile performs compared to a baseline profile(s). Accordingly, a single signature may be associated with multiple profiles, wherein each profile corresponds to an execution of the signature with one or more specific configuration parameters.

Figure 6A:
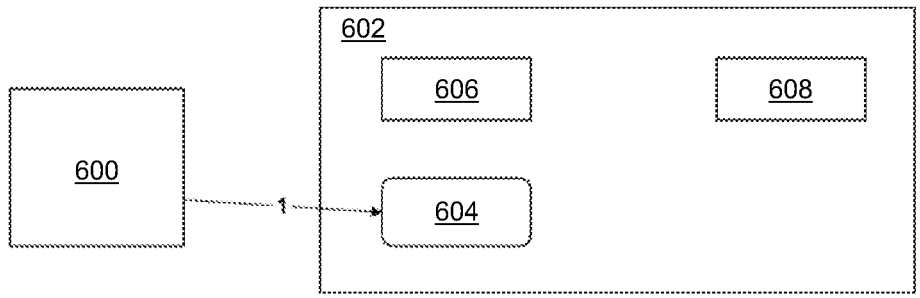
FIGS. 6A-D illustrate a process of creating a baseline profile in accordance with one embodiment.

FIGS. 6A-D illustrate a process of creating a baseline profile in accordance with one embodiment. As seen in FIG. 6A, a user/client application (for simplicity, "client application") 600 may submit a signature or signature set in step 1 to a profiling system 602 and, more specifically, to an agent 604 executing on the profiling system 602.

The client application 600 may also submit baseline profile information to which the cost of a signature will be mapped. The client application 600 may also submit parameters to the agent 604. The profiling system 602 may also include one or more non-isolated processing unit cores 606 and one or more isolated processing unit cores 608. The isolation of a core or a portion of a processing unit may be provided directly as a user option or by making modifications to an operating system or kernel code or by adding additional firmware or drivers. One benefit to isolating a core is that the embodiments herein can more accurately assess the cost of a signature or a signature set. As there are no other processes running in the isolated cores 608, such as system processes or user processes, the randomness of the cost is reduced or nulled by running the signature or signature set in an isolated core. This provides a more accurate cost calculation, which enables the most appropriate signatures to be selected.

Figure 6B:
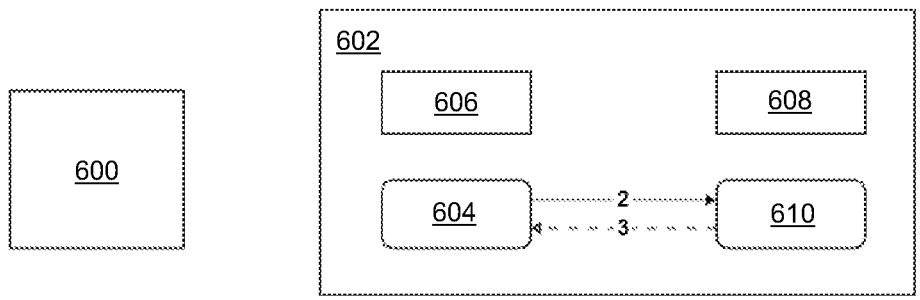

The processing unit core(s) described herein may refer to CPU cores, GPU cores, or any other type of processing component that is part of a processing unit, whether available now or invented hereafter (for simplicity, "CPU core (s)"). Additionally, the embodiments herein may involve isolating the inspection engine in a portion of a processing unit, such as in a core, or in an entirety of a processing unit. In FIG. 6B, the agent 604 in step 2 initiates an inspection engine 610 with certain parameters and without the signature(s). The inspection engine 610 may comprise any application or software that inspects data or code in various states such as in transit, storage, memory, processing, or the like.

The parameters may include parameters for an inspection engine, preconfigured parameters such as those configured in a config file, or other parameters that are based on input provided by the client application 600. These parameters may specify which resources the agent 604 should use such as test case(s), inspection engine(s), CPU core(s), GPU core(s) or the like. The configuration parameters may refer to configuration of the inspection engine by means such as, but not limited, command line data, config file data, system-wide configuration data, configuration of test case(s), or the like.

The inspection engine 610 may communicate results to the agent 604 in step 3 in FIG. 6B. If no result is returned to the agent 604, the agent 604 may use data such as CPU ticks elapsed since initiation or the running time of the inspection engine 610. Memory usage may also be considered.

Figure 6C:
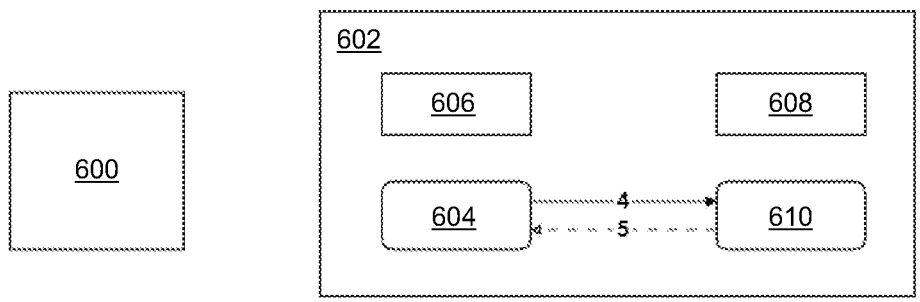
Figure 6D:
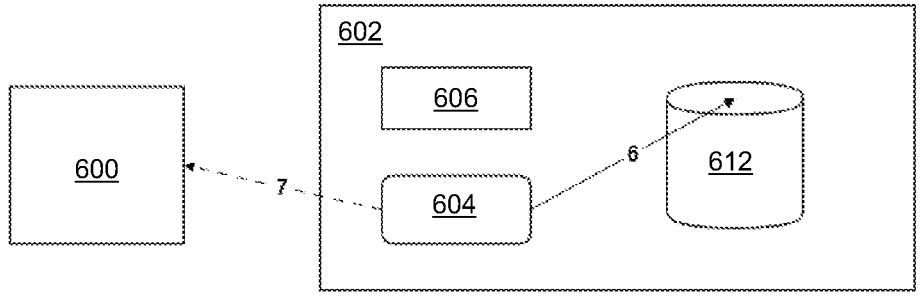

In step 4 in FIG. 6C, the agent 604 may start the inspection engine 610 again with the same parameters as in FIG. 6B, but this time with the signature or signature set. Step 4 is otherwise the same as the first execution of the inspection engine 610 in FIG. 6B (i.e., step 2), but with the signature or signature set loaded for profiling.

The inspection engine 610 may communicate results to the agent 604 in step 5 in FIG. 6C. Step 5 may be the same as step 3 of FIG. 6B, except that this result is for the execution of the inspection engine 610 with the signature or signature set.

The agent 604 may process the obtained results and compute the cost associated with the signature or signature set as discussed above. If profiling of the signature was requested, the profile of the signature as compared to the baseline profile for the same test case(s) and same inspection engine may also be computed. Test cases may be based on the inspection used and may include a PCAP executable file, pdf file, python code, text file, or the like.

The cost of the signature or signature set against the provided test cases and chosen inspection engine is stored as a baseline profile in one or more storage locations in step 612, along with an identifier of the baseline profile. If the client application 600 requires notification, the created baseline profile and any appropriate results will be sent to the client application 600 in step 7.

FIGS. 7A-D illustrate a process of submitting a signature or signature set to a profiler for cost measurement and profiling in accordance with one embodiment. In step 1 of FIG. 7A, a client application 700 may submit a signature/signature set and any other parameters to a profiling system 702 and, more specifically, to an agent 704 executing on the profiling system 702. The profiling system 702 may also include one or more non-isolated CPU cores 706 and one or more isolated CPU cores 708. The isolation of a CPU core or a portion of a processing unit may be provided directly as a user option, by making modifications to the operating system or kernel code, or by adding additional firmware or drivers.

Figure 7A:
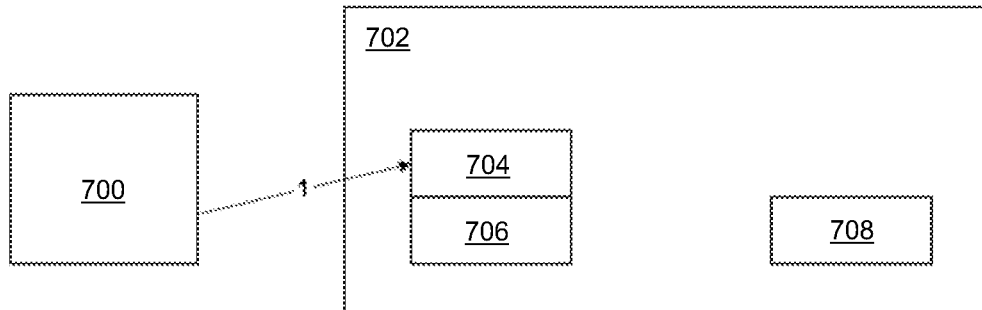
FIGS. 7A-D illustrate a process of submitting a signature or signature set to a profiler for cost measurement and profiling in accordance with one embodiment.
Figure 7B:
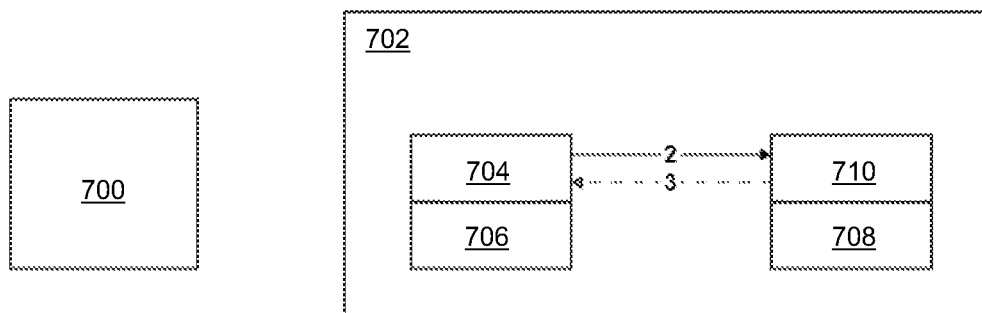

In step 2 in FIG. 7B the agent 704 may start an inspection engine 710 on an isolated CPU core 708. In this step the agent 704 may execute the inspection engine 710 with certain configuration parameters and without the signature/signature set. The inspection engine 710 may comprise any application or software that inspects data or code in various states such as in transit, storage, memory, processing, or the like.

The parameters may be for the inspection engine 710, preconfigured parameters such as those in a config file, or parameters based on inputs provided to the agent 704 from the client application 702. The parameters could specify the resources or options to be used by the agent 704 such as test case(s), inspection engine(s), CPU core(s), or the like.

The agent 704 can receive one or more results from the inspection engine 710 in step 3. If the inspection engine 710 does not provide any result, the agent 704 may use units such as CPU ticks, run time of the inspection engine 710, memory usage, or the like.

Figure 7C:
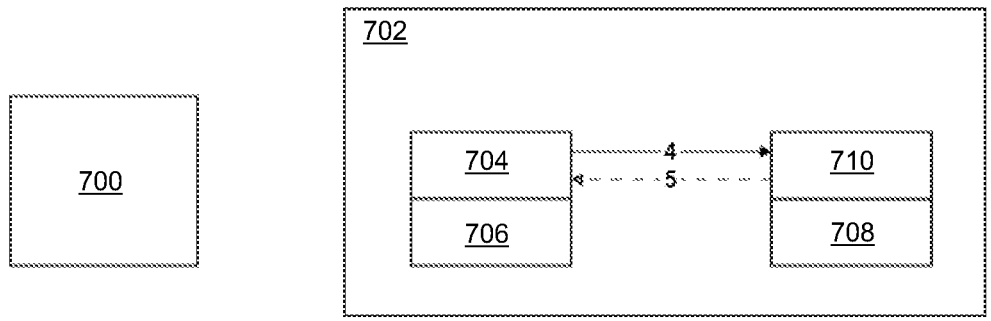
Figure 7D:
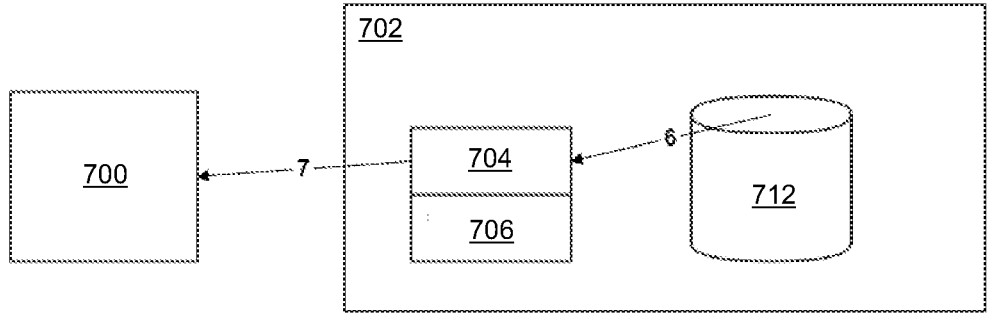

As seen in FIG. 7C, the agent 704 may then in step 4 start the inspection engine 710 with all parameters being the same as indicated as in step 2, but with the signature or signature set for profiling.

The inspection engine 710 may communicate results to the agent 704 in step 5 in FIG. 7C. This step may be same as step 3 in FIG. 7B, except that this result is for the execution of the inspection engine 710 with the signature or signature set.

The agent 704 may process the obtained results and compute the cost associated with the signature or signature set as discussed previously. The agent 704 may then retrieve the cost of the baseline profiles against which the cost of the submitted signature or signature set will be compared. The agent 704 may retrieve these costs from storage 712 in step 6.

If profiling of the signature is requested or otherwise desired, the profile of the signature is compared to the baseline profile for the same test case(s) and same inspection engine. The cost of the signature or signature set against the provided test cases is stored as a profile, along with an ID thereof. If the client application 700 requires notification, the created baseline profile and any appropriate results may be sent to the client application 700 in step 7.

Referring back to FIG. 5, the performance module 522 may assign a performance score to the signature based on its cost or by its classification. For example, in the above examples, the performance module 522 may assign a score of 10 to signatures belonging to the "Very Good" and "Good" categories, and assign a score of 5 to signatures belonging to the "Bad" and "Very Bad" categories.

The signature modification module 524 may make any appropriate modifications to a signature. For example, the signature modification module 524 may modify regex features associated with a signature.

The score calculation module 526 may use scores outputted by any one or more of the submodules 504-22 to calculate an overall signature score for an individual signature.

The outputted scores from one or more modules 504-522 may be used to compute an overall signature score. In some embodiments the overall score may be a weighted average W, for example, calculated by:

$$W = \frac{\sum_{i=1}^{n} \omega_i X_i}{\sum_{i=1}^{n} \omega_i}$$

where: W is the calculated weighted average (i.e., the overall signature score):
  n is the number of individual sub-scores to be averaged,
  $\omega_i$ are the weights applied to each individual sub-score, and
  $X_i$ is the data values to be averaged.

The weights assigned to each individual sub-score may vary and may depend on the application or environment. For example, one administrator may wish to place more emphasis on the CVSS than another administrator would in a different environment, and therefore assign it a higher weight value. Additionally, or alternatively, the weights assigned to each individual sub-score may be determined by any appropriate machine learning algorithm (e.g., neural network(s)) or domain expertise.

Each analyzed signature will therefore be associated with a score. The server 502 or some other device may then rank a plurality of signatures based on their scores. By scoring signatures as described above, the embodiments herein may weigh certain attributes more heavily than others, and identify the highest quality or most appropriate signatures for a particular computing device.

Specifically, different computing devices have different CPU and RAM capacities, and the number of signatures supported by a computing device without adversely affecting performance is a function of these capacities. For example, a first computing device 528 may have 4 GB of RAM and support 7,000 signatures, whereas a second computing device 530 may have 16 GB of RAM and support 18,000 signatures.

Computing devices, particularly those with less RAM, should therefore be selective in loading signatures into memory for scanning traffic. These signatures are not selected at random, but are instead selected based at least in part on their scores. This ensures that the selected scores cover, for example, signatures with critical vulnerabilities, vulnerabilities having high CVSS scores, vulnerabilities determined to be zero-day threats, vulnerabilities for which published exploits are available, vulnerabilities associated with critical threats such as malware, signatures that have been triggered in customer environments, or some combination thereof.

Accordingly, a computing device may receive a first plurality of signatures from one or more locations over a network. Each of these received signatures may have been previously analyzed and assigned a score as discussed above. The computing device may also receive a selection of a second plurality of signatures from the first plurality of signatures that are to be loaded into RAM of the computing device. That is, a computing device may store all received signatures in a database or other location, but only load the selected second plurality of signatures into RAM. The second plurality of signatures may be associated with any suitable indicia or designation to indicate they are to be loaded into RAM. Additionally, or alternatively, an operator of the computing device (e.g., an enterprise associated with the computing device) may select which signatures are to be loaded.

Referring back to FIG. 5, the server 502 may transmit a first plurality of signatures 532 to the first computing device 528 and to second computing device 530 for scanning. As discussed above, the first computing device 528 may have less RAM than the second computing device 530 and may therefore support less signatures than the second computing device 530.

A first plurality of threat signatures 532 may be divided into two or more tiers as seen in FIG. 5. In these embodiments, each tier may be associated with a defined number of signatures. For example, each tier may be associated with one thousand signatures, wherein a first tier includes signatures with the highest one thousand scores and a second tier includes signatures with the second highest thousand scores, etc. A computing device such as the first computing device 528 may have RAM sufficient to store seven thousand signatures. In this tier-based approach, the selected plurality of signatures could therefore include signatures of the top seven tiers.

In other embodiments, a first tier may be associated with threat signatures having been assigned a score in a first range, a second tier is associated with threat signatures having been assigned a score in a second range, and so on. In these embodiments, the selected plurality of signatures could include all signatures having been assigned a score in certain ranges, storage space permitting.

The first plurality of signatures 532 transmitted to the first computing device 528 may indicate a selection of a second plurality of signatures 534 that are to be loaded into RAM of the first computing device 528. For example, based on the RAM of the first computing device 528, only select tiers or groups of the first plurality of signatures 532 may be chosen for loading. As seen in FIG. 5, of the first plurality of threat signatures sent to the first computing device 528, only two groups or tiers of signatures 534 are selected (indicated by the darkened borders) for the first computing device 528.

The second computing device 530, on the other hand, has more RAM and may accommodate more signatures than the first computing device 528. As seen in FIG. 5, all groups or tiers of signatures 536 may be selected (indicated by the darkened borders) for loading into RAM of the second computing device 530.

The computing device(s) may then scan network traffic using one or more signatures loaded into RAM. For example, the computing device may inspect or otherwise scan packets to detect threats in network traffic, such as traffic that matches a malicious pattern.

If the computing device detects a pattern in traffic that matches a loaded signature, the computing device may perform one or more remedial actions. For example, the computing device may be associated with a remedial action facility such as the remedial action facility 128 of FIG. 1 to remediate a threat as discussed previously.

Figure 8:
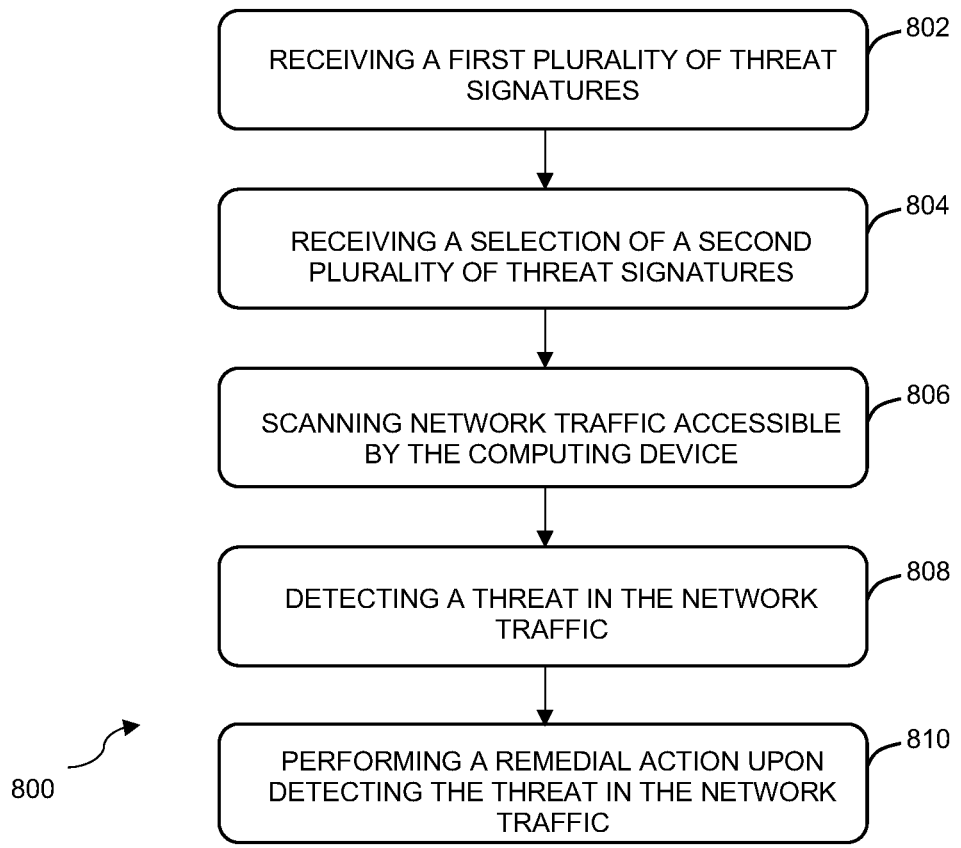
FIG. 8 depicts a flowchart of a method for detecting threats using threat signatures loaded in a computing device in accordance with one embodiment.

FIG. 8 depicts a flowchart of a method 800 for detecting threats using threat signatures loaded in a computing device. The systems or components of any one of FIGS. 1-5 may perform the steps of method 800.

Step 802 involves receiving a first plurality of threat signatures at a computing device. This computing device may be similar to the first or second computing devices of FIG. 5, for example. These signatures may be communicated from and previously stored in one or more signature databases.

A server such as the server 502 of FIG. 5 or any other suitable device may have previously analyzed the signatures and assigned a score to each signature. The assigned scores may be associated with one or more metadata attributes such as those discussed previously.

Step 804 involves receiving a selection of a second plurality of threat signatures from the first plurality of threat signatures to load into random access memory (RAM) of the computing device. At least one threat signature of the selected plurality of threat signatures is selected based on its assigned score. Although not shown in FIG. 8, method 800 may further include a step of determining an amount of RAM available on the computing device. Then an amount of the selected plurality of threat signatures is further based on the amount of RAM determined to be available on the computing device.

The selected, second plurality of signatures may include a predefined first subset of threat signatures that are associated with a first tier of threat signatures, and a predefined second subset of threat signatures that are associated with a second tier of threat signatures. For example, the first tier may be associated with threat signatures having been assigned a score in a first range, and the second tier may be associated with threat signatures having been assigned a score in a second range.

Step 806 involves scanning network traffic accessible by the computing device using the at least one threat signature of the selected plurality of threat signatures. The computing device may perform deep packet inspection of network traffic using one or more selected threat signatures.

Step 808 involves detecting a threat in the network traffic based on the scanning using the at least one threat signature of the selected plurality of threat signatures. For example, a pattern in analyzed traffic may match a selected threat signature.

Step 810 involves performing a remedial action upon detecting the threat in the network traffic. For example, the remedial action may include issuing an alert regarding the detected threat, as well as any one or more of other remedial actions such as those discussed previously.

Figure 9:
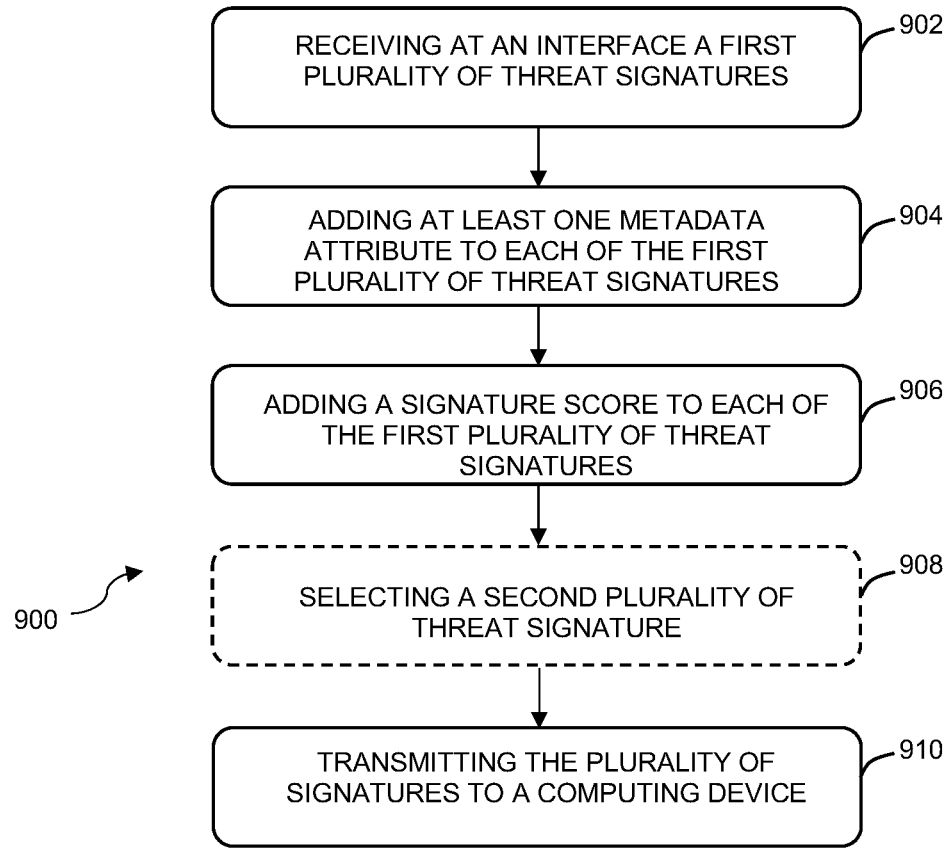
FIG. 9 depicts a flowchart of a method of generating a plurality of threat signatures in accordance with one embodiment.

FIG. 9 depicts a flowchart of a method 900 for generating a plurality of threat signatures in accordance with one embodiment. The systems or components of any one of FIGS. 1-5 may perform the steps of method 900.

Step 902 involves receiving at an interface a first plurality of threat signatures. These signatures may be stored in one or more databases, for example. The first plurality of threat signatures may be received at a server such as the server 502 of FIG. 5.

Step 904 involves adding, using one or more processors executing instructions stored on memory, at least one metadata attribute to each of the first plurality of threat signatures. A metadata attribute may be a cost associated with the threat signature that is obtained by determining a difference in performance between an execution of an inspection engine against a test case without the threat signature and an execution of the inspection engine against the test case with the threat signature.

Step 906 involves adding, using the one or more processors, a signature score to each of the first plurality of threat signatures calculated utilizing the at least one added metadata attribute. A server such as the server 502 may consider a plurality of sub-scores associated with each of a plurality of metadata attributes such as those discussed previously. The server may assign a weight to each attribute, and may calculate a weighted average to generate the signature score for each signature.

For example, FIG. 10 depicts one example of a threat signature 1000 in accordance with one embodiment. As seen in FIG. 10, a plurality of metadata attributes have been added to the signature 1000 and highlighted. For example, for the signature 1000, the Vendor attribute has a value of Microsoft, and a CVSS attribute value of 9.8.

Step 908 involves selecting a second plurality of threat signatures from the first plurality of threat signatures for storage at the computing device. The selection of the second plurality of signatures may be based on the signature scores of each of the first plurality of threat signatures and RAM available for storage in the computing device. Step 908 may further involve the step of transmitting the selection of the second plurality of threat signatures to the computing device.

Step 910 involves transmitting the plurality of threat signatures, including the assigned signature scores, to a computing device configured for scanning network activity. The selected signatures may be loaded into RAM of the computing device, and then used for scanning network activity.

In this way, the foregoing methods and systems provide an improved manner in which signatures are evaluated and selected for loading into one or more computing devices. The embodiments herein provide novel ways for analyzing and scoring signatures based on a number of attributes. For example, by isolating the signature analysis process in a CPU core, embodiments herein can accurately measure the performance of a signature. This helps select the most appropriate signatures for use in scanning network activity.

As computing devices have limited amount computing resources, they should use its resources as efficiently as possible. As resources are expended in performing signature-based network activity scanning, it is important that these computing device's store and use the most appropriate signatures and, for example, do not consume resources by using irrelevant signatures. By selecting the most appropriate signatures for a computing device to use for scanning network activity, embodiments herein improve the performance of computing devices by enabling them to use their resources as efficiently as possible and be protected from the most relevant network threats.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for detecting threats using threat signatures loaded in a computing device, the method comprising:

receiving a first plurality of threat signatures at a computing device, at least one threat signature of the first plurality of threat signatures having been assigned a score based on at least one metadata attribute having been added to the at least one threat signature, the at least one metadata attribute having been added to the at least one threat signature includes a quality score having been determined by:

determining a signature cost associated with the threat signature, wherein the signature cost indicates a difference in performance between an execution of the computing device without the threat signature and an execution of the computing device with the threat signature, comparing the signature cost to a baseline performance value, and adding the quality score to the threat signature based on the comparison of the signature cost to the baseline performance value;

receiving a selection of a second plurality of threat signatures from the first plurality of threat signatures to load into random access memory (RAM) of the computing device, wherein at least one threat signature of the selected plurality of threat signatures is selected based on its assigned score;

scanning network traffic accessible by the computing device using the at least one threat signature of the selected plurality of threat signatures;

detecting a threat in the network traffic based on the scanning using the at least one threat signature of the selected plurality of threat signatures; and performing a remedial action upon detecting the threat in the network traffic.

2. The method of claim 1, wherein performing the remedial action includes issuing an alert regarding the detected threat.

3. The method of claim 1, further comprising determining an amount of RAM available on the computing device, wherein an amount of the selected plurality of threat signatures is further based on the amount of determined RAM available on the computing device.

4. The method of claim 1, further comprising storing the first plurality of threat signatures in a signature database associated with the computing device.

5. The method of claim 1, wherein the selection of the second plurality of threat signatures includes:
a predefined first subset of threat signatures that are associated with a first tier of threat signatures, and
a predefined second subset of threat signatures that are associated with a second tier of threat signatures.

6. The method of claim 5, wherein the first tier is associated with threat signatures having been assigned a score in a first range, and the second tier is associated with threat signatures having been assigned a score in a second range.

7. A computing device for identifying threats in monitored network activity, the computing device comprising:
an interface for:
receiving a first plurality of threat signatures, at least one threat signature of the first plurality of threat signatures having been assigned a score based on at least one metadata attribute having been added to the at least one threat signature, the at least one metadata attribute having been added to the at least one threat signature includes a quality score having been determined by:
determining a signature cost associated with the threat signature, wherein the signature cost indicates a difference in performance between an execution of the computing device without the threat signature and an execution of the computing device with the threat signature,
comparing the signature cost to a baseline performance value, and
adding the quality score to the threat signature based on the comparison of the signature cost to the baseline performance value, and
receiving a selection of a second plurality of threat signatures from the first plurality of threat signatures that are loaded into random access memory (RAM) of the computing device, wherein at least one threat signature of the selected plurality of threat signatures is selected based on its assigned score; and
one or more processing devices executing computer-executable instructions for:
scanning network traffic using at least one threat signature of the selected plurality of threat signatures,
detecting a threat in the network traffic based on the scanning using the at least one threat signature of the selected plurality of threat signatures, and
performing a remedial action upon detecting the malicious pattern in the network traffic.

8. The computing device of claim 7 wherein the one more or processing devices perform the remedial action by issuing an alert regarding the detected threat.

9. The computing device of claim 7 wherein an amount of the selected plurality of threat signatures is further based on an amount of RAM available on the computing device.

10. The computing device of claim 7 wherein the computing device further includes a signature database for storing the first plurality of threat signatures.

11. The computing device of claim 7 wherein the selection of the second plurality of threat signatures includes:
a predefined first subset of threat signatures that are associated with a first tier of threat signatures, and
a predefined second subset of threat signatures that are associated with a second tier of threat signatures.

12. The computing device of claim 11 wherein the first tier is associated with threat signatures having been assigned a score in a first range, and the second tier is associated with threat signatures having been assigned a score in a second range.

13. A system for monitoring network activity, the system comprising:
one or more processing devices executing computer-executable instructions to:
add at least one metadata attribute to each of a first plurality of threat signatures,
assign a signature score to each of the first plurality of threat signatures utilizing the at least one metadata attribute added to each of the first plurality of threat signatures, the at least one metadata attribute having been added to the at least one threat signature includes a signature cost, wherein the signature cost indicates a difference in performance between an execution of an inspection engine without the threat signature and an execution of the inspection engine with the threat signature and is further based on a comparison with a baseline performance value;
transmit the first plurality of threat signatures including the added at least one metadata attribute to a computing device, wherein the computing device is configured to scan network traffic using at least one threat signature of the first plurality of threat signatures, detect a threat in the network traffic based on the scanning using the at least one threat signature of the first plurality of threat signatures, and perform a remedial action upon detecting the threat in the network traffic.

14. The system of claim 13 wherein the one or more processing devices are further configured to determine an amount of RAM available on the computing device, and an amount of the first plurality of signatures selected and transmitted to the computing device is further based on the determined amount of RAM available on the computing device.

15. The system of claim 13 wherein the signature score assigned to each of the first plurality of threat signatures is a weighted average of the metadata attributes added to each of the first plurality of threat signatures.

16. The system of claim 13 wherein the first plurality of threat signatures includes:
a predefined first subset of threat signatures that are associated with a first tier of threat signatures, and
a predefined second subset of threat signatures that are associated with a second tier of threat signatures.

17. The system of claim 16 wherein the first tier is associated with threat signatures having been assigned a score in a first range, and the second tier is associated with threat signatures having been assigned a score in a second range.

* * * * *